United States Patent

Kawazura et al.

[11] Patent Number: 6,019,832
[45] Date of Patent: *Feb. 1, 2000

[54] PROCESS FOR PRODUCTION OF SURFACE-TREATED CARBON BLACK FOR RUBBER REINFORCEMENT

[75] Inventors: Tetsuji Kawazura; Masayuki Kawazoe; Fumito Yatsuyanagi; Shuji Takahashi, all of Hiratsuka, Japan

[73] Assignee: The Yokohama Rubber Co., Ltd., Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/849,917

[22] PCT Filed: Oct. 16, 1996

[86] PCT No.: PCT/JP96/03004

§ 371 Date: Jun. 18, 1997

§ 102(e) Date: Jun. 18, 1997

[87] PCT Pub. No.: WO97/15632

PCT Pub. Date: May 1, 1997

[30] Foreign Application Priority Data

Oct. 25, 1995 [JP] Japan ..................................... 7-277862

[51] Int. Cl.[7] .............................. C08K 9/02; C08L 21/00; C09C 1/56
[52] U.S. Cl. .......................... 106/472; 106/475; 524/492; 524/495; 524/424; 523/215; 523/216; 523/210
[58] Field of Search ..................................... 106/472, 475, 106/492; 427/215; 428/403, 44; 524/424, 492, 495; 523/210, 215, 216; 423/449.2, 460

[56] References Cited

U.S. PATENT DOCUMENTS

| 2,885,366 | 5/1959 | Iler | 252/313 |
|---|---|---|---|
| 2,913,419 | 4/1959 | Alexander | 252/313 |
| 4,941,923 | 7/1990 | Sotogoshi et al. | 106/493 |
| 5,340,393 | 8/1994 | Jacobson | 106/492 |
| 5,679,728 | 10/1997 | Kawazura et al. | 524/495 |
| 5,883,179 | 3/1999 | Kawazoe et al. | 524/495 |

FOREIGN PATENT DOCUMENTS

| 0 711 805 A1 | 5/1996 | European Pat. Off. . |
|---|---|---|
| 0 799 854 A1 | 10/1997 | European Pat. Off. . |
| 61-28560 | 2/1986 | Japan . |
| 63-63755 | 3/1988 | Japan . |
| 2 271 765 | 4/1994 | United Kingdom . |

OTHER PUBLICATIONS

CA 127:35765, Kawamo et al. "Manufacture of surface treated carbon black for reinforcing rubbers with good wear resistance and low electric resistance", corresponds to JP 95–277862, Oct. 1995.

CRC Handbook of Chemistry and Physics, 65th edition, CRC press Inc. Boca Raton, Florida, (no month) 1984.

*Primary Examiner*—Michael Marcheschi
*Attorney, Agent, or Firm*—Finnegan, Henderson, Farabow, Garrett & Dunner, L.L.P.

[57] ABSTRACT

A process for producing surface-treated carbon black for rubber reinforcement comprising: a surface treatment reaction step of dispersing carbon black for rubber reinforcement in water, followed by reacting a metal silicate and an acid in the dispersion to thereby deposit amorphous silica on the surface of the carbon black; and a subsequent aging step of bringing the pH of the dispersion to not more than 7.

7 Claims, No Drawings

PROCESS FOR PRODUCTION OF SURFACE-TREATED CARBON BLACK FOR RUBBER REINFORCEMENT

TECHNICAL FIELD

The present invention relates to a process for producing surface-treated carbon black for rubber reinforcement (hereinbelow referred to simply as "surface-treated carbon black"). More particularly, it relates to a process for producing surface-treated carbon black for rubber reinforcement having amorphous silica deposited on the surface thereof. The surface-treated carbon black for rubber reinforcement thus obtained provides superior physical properties such as wear resistance, grip performance, and low rolling resistance (i.e., low heat generation), when blended into rubber compositions for tires and various other types of rubber products such as belt conveyors and industrial rollers.

BACKGROUND ART

Reinforcing fillers such as carbon black, silica have long been used for reinforcing rubber or rubber reinforcement. Among these, silica, as compared with carbon black, has a property of a low tan δ at high temperatures (around 60° C.) and a high tan δ at low temperatures (around 0° C.), and therefore, when used for rubber compositions for tire treads, has the advantage capable of producing a tire having a low rolling resistance and a high gripping power. Silica, however, is inferior to carbon black in wear resistance and has a low electrical conductivity, and therefore, if used for tires, there is the problem that the tire will pick up a charge when driven on and will cause noise in the radio and other electronic equipments in the car and, in some cases, will cause their malfunction.

Covering the surface of the pigment etc. with, for example, silica to improve their dispersibility and to increase the weather resistance has been proposed in, for example, Japanese Examined Patent Publication (Kokoku) No. 50-14254 and Japanese Examined Patent Publication (Kokoku) No. 7-30269, but neither of these makes any reference to covering the surface of the carbon black used for reinforcing the rubber with silica.

SUMMARY OF INVENTION

Accordingly, an object of the present invention is to provide a process for producing surface-treated carbon black for rubber reinforcement, which has a superior tan δ temperature dependency of silica, provides excellent wear resistance, and further is free from problems derived from the low electrical conductivity.

In accordance with the present invention, there is provided a process for producing surface-treated carbon black for rubber reinforcement comprising;

a surface treatment reaction step of dispersing carbon black for rubber reinforcement in water followed by reacting a metallic silicate and an acid to thereby deposit amorphous silica on the surface of the carbon black; and a subsequent aging step of bringing the pH of the dispersion to not more than 7.

DETAILED DESCRIPTION OF THE INVENTION

The present inventors engaged in intensive studies on a process for producing surface-treated carbon black for rubber reinforcement which, as explained above, has the superior tan δ temperature dependency of silica, provides excellent wear resistance, and further is free from problems derived from a low electrical conductivity and, as a result, succeeded in achieving the above-mentioned object by depositing silica on the surface of carbon black under the above specified conditions.

As the carbon black for reinforcing rubber usable as the starting material in the present invention, any carbon black which has been generally used in the past as carbon for reinforcement of tires or other rubber products can be used. Preferred types of carbon black are the GPF (General Purpose Furance) to SAF (Super Abrasion Furance) grades. It is possible to variously select these or to blend two or more types, depending on the application of the rubber composition.

According to the present invention, the above-mentioned carbon black for reinforcing rubber is first dispersed in water. To improve the dispersibility of the carbon black, a suitable dispersant (e.g., methanol or various types of surfactants) is added to obtain a homogeneous slurry. Then, a metal silicate (or a silicic acid metal salt) in an amount corresponding to the amount of the silica desired to be deposited on the surface of the carbon black is added in the form of, for example, an aqueous solution with stirring, to the aqueous slurry of the carbon black obtained above. The "metal silicate" referred to here is an alkali metal salt or alkaline earth metal salt of silica acid. As the alkaline earth metals, sodium, aluminum, magnesium, potassium, calcium, and barium may be exemplified but preferably the salt produced at the reaction step is soluble in water from the viewpoint of the ease of its removal. Note that the amount of the silica to be deposited on the surface of the carbon black is not particularly limited, but preferably is 0.1 to 20% by weight based upon the weight of the surface-treated carbon black. On the other hand, an acid (for example, sulfuric acid, hydrochloric acid, nitric acid etc.) is added, with stirring, at the same time as the addition the aqueous solution of the metal silicate for the purpose of neutralizing the metal silicate added. It is preferable to perform the addition of the aqueous solution of the acid and the addition of the metal silicate simultaneously and in substantially or approximately the same amounts at a time. The feed rate of the metal silicate is preferably 0.001 to 0.110 g/min in terms of the amount of silica based upon 100 grams of carbon black. If the feed rate is too slow, the production efficiency will be undesirably decreased, while conversely if the feed rate is too fast, the improvement in the temperature dependency of the tan δ and the wear resistance are unpreferably tend to decrease.

The pH of the reaction mixture at the above-mentioned surface treatment reaction step should be from 6 to 12, preferably 7 to 10. If the pH is less than 6, the improvement in the temperature dependency of the tan δ and the wear resistance are unpreferably decreased, while conversely if the pH is more than 12, the amorphous silica will not precipitate and deposit on the surface of the carbon black and the desired surface treated carbon cannot be obtained. Further, although the reaction temperature is not particularly limited, the preferable temperature is 50 to 95° C. from the practical viewpoint.

It is believed that a part or all of the silica deposits on the surface of the carbon black in the surface treatment reaction step, but the pH of the system is adjusted to at least 4, preferably 5 to 7, and the composition is allowed to stand at a temperature of 50 to 95° C., with stirring, to age it for the purpose of ensuring that the amount of deposition of the silica becomes the desired amount, that is, the silica which could not be fully formed in the reaction step be further produced and deposited.

It is important to continuously stir the mixture at the time of both the above-mentioned surface treatment reaction step and the aging step. The stirring is performed at, for example, a rate over 100 r.p.m. in the case of a reaction vessel having a diameter of 20 cm and a rotor (i.e., two-phase blades) having a diameter of 10 cm. The stirring rate differs depending on the specifications of the reaction apparatus and the stirring apparatus, but when changing the apparatuses or scaling up the production capacity, the stirring rate can be determined by the method usually used in the field of chemical engineering. After the surface treatment reaction and aging are completed, the mixture is filtered, washed with water, and dried to obtain the desired silica surface-treated carbon black. Note that it is also possible to add a conventional flocculating agent before the filtration.

The silica surface-treated carbon black for rubber reinforcement according to the present invention can be blended into any cross-linkable rubber component to provide a rubber composition superior in wear resistance, grip performance, rolling resistance, etc. Examples of such cross-linkable rubbers, are natural rubber (NR), various types of butadiene rubbers (BR), various types of styrene-butadiene copolymer rubbers (SBR), polyisoprene rubber (IR), butyl rubber (IIR), acrylonitrile-butadiene rubber, chloroprene rubber, ethylene-propylene copolymer rubber, ethylene-propylene-diene terpolymer rubber, styrene-isoprene copolymer rubber, styrene-isoprene-butadiene copolymer rubber, isoprene-butadiene copolymer rubber, chlorosulfonated polyethylene, acryl rubber, epichlorohydrin rubber, polysulfide rubber, silicone rubber, fluororubber, urethane rubber, etc. These may be used alone or in any blend thereof. When using as a blend, the blend ratio is not particularly limited.

The silica surface-treated carbon black according to the present invention is preferably blended in an amount of 10 to 200 parts by weight and more preferably 15 to 150 parts by weight, based on 100 parts by weight of the rubber component. If the amount blended is too small, the desired effect cannot be obtained, while if conversely the amount is too large, there is fear of the hardness becoming too high, the processability falling, or the usefulness as a rubber material otherwise becoming poorer. It is also possible to use, in the rubber composition, any coventional carbon black and/or silica normally blended into rubber compositions, in addition to the above-mentioned silica surface-treated carbon black.

If necessary or optionally, in addition to the above-mentioned rubber, carbon black having the silica deposited on the surface thereof, etc., any compounding agent normally used in the rubber industry such as sulfur, organic peroxides, softening agents, antioxidants, vulcanization accelerators, fillers, plasticizers, silane coupling agents, etc. may be appropriately blended into the above-mentioned rubber composition is a conventional amount.

EXAMPLES

The present invention will now be further illustrated by, but is by no means limited to, the following Examples.

Examples 1 to 10 and Comparative Examples 1 to 5

Preparation of Surface-Treated Carbon Black

The following method was used to produce about 1 kg of surface-treated carbon black.

As the carbon black, 800 g of the HAF grade (N339, Sheast KH) was used. 1600 g of a 10% by weight aqueous solution of a carbon black dispersant (methanol) was previously mixed therewith and then, for example, 1.8 liters of water per 100 g of carbon black (CB) were added thereto with stirring, to obtain a carbon black slurry. Next, since the desired amount of the silica deposited on the surface of the carbon black was set here as 5% by weight, 133.2 g of sodium silicate (JIS No. 1) corresponding to the above-mentioned amount of silica was weighed out and diluted by 0.8 liter of water.

The carbon black slurry obtained above was heated to 90° C. and the pH was adjusted to the prescribed value (shown in Table I). The aqueous solution of sodium silicate obtained above was dropwise added into the above carbon black slurry at a predetermined rate (given in Table I) with stirring. Simultaneously, a 1.0% by weight aqueous solution of sulfuric acid was added to keep the pH of the reaction mixture at the prescribed pH.

After the addition of the aqueous solution of sodium silicate was finished, the mixture was allowed to stand for about 30 minutes with stirring, while maintaining the prescribed pH and a temperature of 90° C. (aging). After aging, the resultant reaction mixture was filtered, washed with water, and dried to obtain the desired surface-treated carbon black.

Methods for Measurement of Properties of Surface-Treated Carbon Black

1) Silica Content

A sample of the surface-treated carbon black was burned to ashes in an electric furnace at 600° C., the ash was treated with hydrogen fluoride, and the reduction in weight was determined as the silica content. The result was shown as % by weight against the original surface-treated carbon.

2) Nitrogen Specific Surface Area ($N_2SA$)

This was measured according to a method of ASTM D 3037.

Methods for Measurement of Physical Properties of Rubber

Various rubber compositions were prepared by kneading by a Banbury mixer and roller according to the following formulation by an ordinary method (vulcanization conditions: 160° C.×30 minutes)

| Formulation Table | |
|---|---|
| SBR 1502: | 100 parts by weight |
| Reinforcing filler: | 50 parts by weight |
| Silane coupling agent*1: | 3 parts by weight*2 |
| Zinc oxide (JIS No. 3): | 3 parts by weight |
| Stearic acid: | 2 parts by weight |
| Antioxidant*3: | 2 parts by weight |
| Powdered sulfur: | 2 parts by weight |
| Vulcanization accelerator*4: | 1 part by weight |

1) SI 69 Silane Camping agent (made by Degussa)
2) Not used when reinforcing filler is carbon black.
3) SANTOFLEX 13 antioxidant (made by Monsanto)
4) SANTOCURE NS Vulcanization accelerator (made by Monsanto)

1) Tensile Strength

This was measured based on a method according to JIS K 6301.

2) Wear Resistance Index

The loss due to wear was measured using a Lambourn wear resistance tester under conditions of a load of 5 kg, a slip ratio of 25%, a time of 4 minutes, and room temperature and indicated as an index. Note that the larger the figure, the better the wear resistance.

3) tan δ

This was measured using a viscoelasticity spectrometer made by Toyo Seiki Seisakusho under an amplitude of ±2%, a frequency of 20 Hz, and a static stress of 10%.

4) Volume-Intrinsic Electrical Resistance

This was measured based on a method according to ASTM D 991 or JIS K 6911. The results are shown in Table I.

TABLE I

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Type of carbon black used | N339[1] | N339[1] | N339[1] | N339[1] | N339[1] | N339[1] | N339[1] | N339[1] |
| Surface treatment reaction step | | | | | | | | |
| pH at treatment | 7 | 10 | 5 | 5 | 5 | 5 | 10 | 5 |
| Feed rate of sodium silicate (SiO$_2$ g/min·CB 100 g) | 0.120 | 0.120 | 0.060 | 0.120 | 0.120 | 0.120 | 0.060 | 0.060 |
| Aging step | | | | | | | | |
| pH at aging | 3 | 3 | 3 | 3 | 5 | 7 | 3 | 7 |
| Properties of surface-treated carbon black | | | | | | | | |
| Amount of silica (wt %) | 4.9 | 4.9 | 5.1 | 5.0 | 5.0 | 5.0 | 5.1 | 4.9 |
| Nitrogen specific area (BET method) | 102 | 102 | 101 | 100 | 102 | 102 | 100 | 102 |
| Properties of rubber composition | | | | | | | | |
| Tensile strength (Mpa) | 24.4 | 24.4 | 25.0 | 25.0 | 24.1 | 25.0 | 24.7 | 25.0 |
| Wear resistance index | 99 | 99 | 99 | 98 | 99 | 100 | 100 | 101 |
| tan δ (0° C.) | 0.299 | 0.302 | 0.298 | 0.299 | 0.299 | 0.299 | 0.300 | 0.298 |
| tan δ (60° C.) | 0.166 | 0.164 | 0.164 | 0.166 | 0.164 | 0.164 | 0.164 | 0.163 |
| Electrical resistance (Ω·cm × E$^2$) | 0.92 | 1.03 | 1.05 | 1.00 | 0.98 | 0.97 | 1.05 | 1.00 |

| | Ex. 9 | Ex. 10 | Comp. Ex. 1 | Comp. Ex. 2 | Comp. Ex. 3 | Comp. Ex. 4 | Comp. Ex. 5 |
|---|---|---|---|---|---|---|---|
| Type of carbon black used | N339[1] | N339[1] | N339[1] | N339[1] | N339[1] | N339[1] | Silica[2] |
| Surface treatment reaction step | | | | | | | |
| pH at treatment | 10 | 10 | 10 | 10 | 5 | No surface treatment | |
| Feed rate of sodium silicate (SiO$_2$ g/min·CB 100 g) | 0.060 | 0.098 | 0.060 | 0.060 | 0.060 | | |
| Aging step | | | | | | | |
| pH at aging | 7 | 7 | No aging | 8 | 8 | — | — |
| Properties of surface-treated carbon black | | | | | | | |
| Amount of silica (wt %) | 4.8 | 4.9 | 1.1 | 1.8 | 2.4 | 0.0 | 100.0 |
| Nitrogen specific area (BET method) | 103 | 102 | 101 | 102 | 102 | 94 | 193 |
| Properties of rubber | | | | | | | |

TABLE I-continued

| composition | | | | | | | |
|---|---|---|---|---|---|---|---|
| Tensile strength (Mpa) | 24.7 | 24.9 | 24.8 | 24.7 | 24.6 | 25.8 | 22.9 |
| Wear resistance index | 102 | 100 | 100 | 99 | 99 | 100 | 88 |
| tan δ (0° C.) | 0.300 | 0.300 | 0.299 | 0.300 | 0.301 | 0.304 | 0.310 |
| tan δ (60° C.) | 0.163 | 0.164 | 0.180 | 0.176 | 0.178 | 0.182 | 0.159 |
| Electrical resistance (Ω·cm × E$^2$) | 0.97 | 0.98 | 0.99 | 1.03 | 1.01 | 1.00 | 112.00 |

[1]N339: Seast KH, Tokai Carbon Co.
[2]Silica: NIPSIL AQ Silica, made by Nippon Silica Kogyo K.K.

As is clear from the results shown in Table I, in the Examples using the surface-treated carbon black for rubber reinforcement produced by the process according to the present invention, compared with the conventional standard examples of Comparative Examples 4 and 5, rubber formulations were obtained having an excellent wear resistance and a low electrical conductivity while having the property of a low tan δ in the high temperature region and a high tan δ in the low temperature region. Note that the rubber formulations of Comparative Examples 1 to 3 had a higher tan δ at 60° C. compared with Examples 1 to 10 according to the present invention and failed to give the desired amount of deposition of silica (5 wt %).

What is claimed is:

1. A rubber composition comprising:
   (i) a cross-linkable rubber component; and
   (ii) a surface-treated carbon black produced by (a) a surface treatment step of dispersing carbon black for rubber reinforcement in water to form a dispersion, followed by adding a metal silicate and an acid to the dispersion to thereby deposit amorphous silica on the surface of the carbon black followed by (b) a subsequent aging step of stirring the resultant carbon black in the dispersion where a pH of the dispersion is from 3 to 7.

2. The rubber composition of claim 1, wherein the surface treatment of the carbon black in step (a) is carried out at a pH of from 6 to 12.

3. The rubber composition of claim 1, wherein the metal silicate is added to the dispersion in the surface treatment of the carbon black in step (a) at a rate of 0.001 g/min to 0.110 g/min in terms of silica based upon 100 g of the carbon black.

4. The rubber composition of claim 1, wherein the amount of amorphous silica deposited on the surface of the carbon black is from 0.1 to 20% by weight based upon the weight of the surface-treated carbon black.

5. The rubber composition of claim 2, wherein the surface treatment of the carbon black in step (a) is carried out at a pH of from 7 to 10.

6. The rubber composition of claim 1, wherein methanol is added when the carbon black is dispersed in water.

7. The rubber composition of claim 1, wherein the rubber component is at least one rubber selected from the group consisting of NR, BR, SBR, IR, and IIR.

* * * * *